United States Patent Office 3,605,991
Patented Sept. 20, 1971

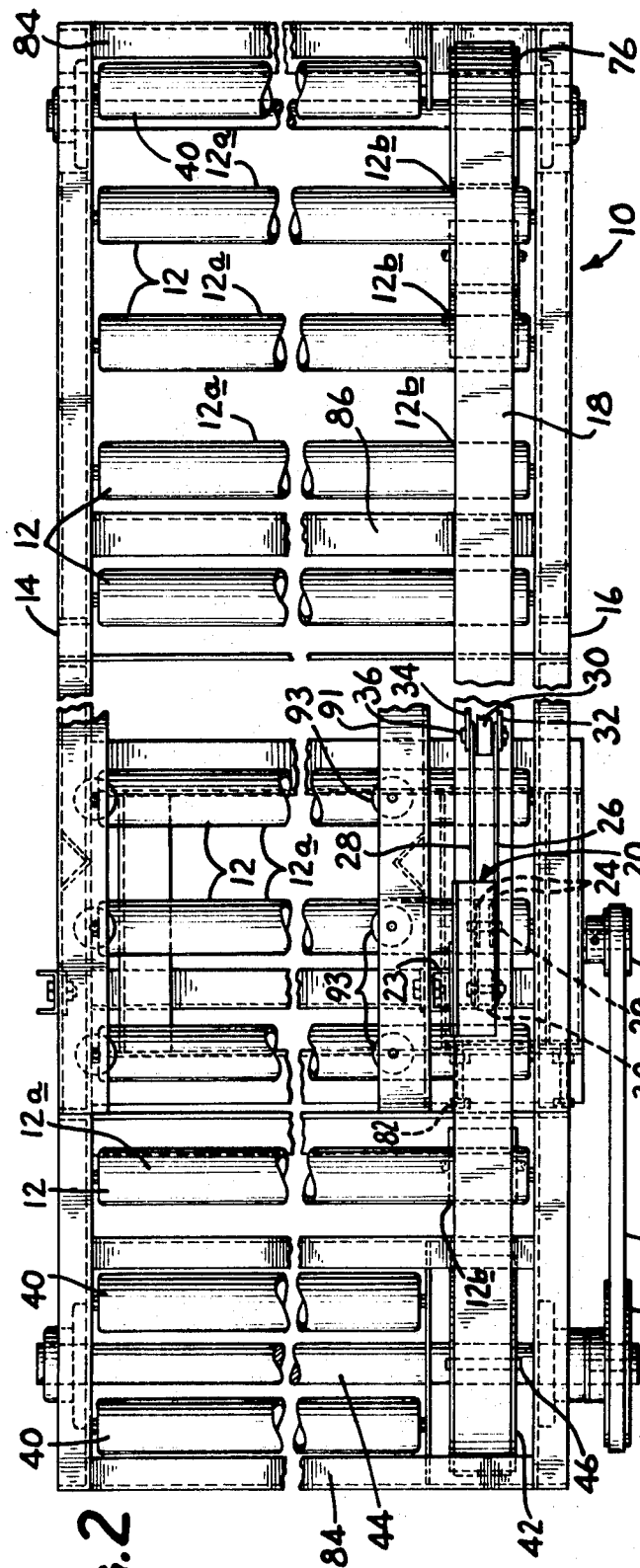

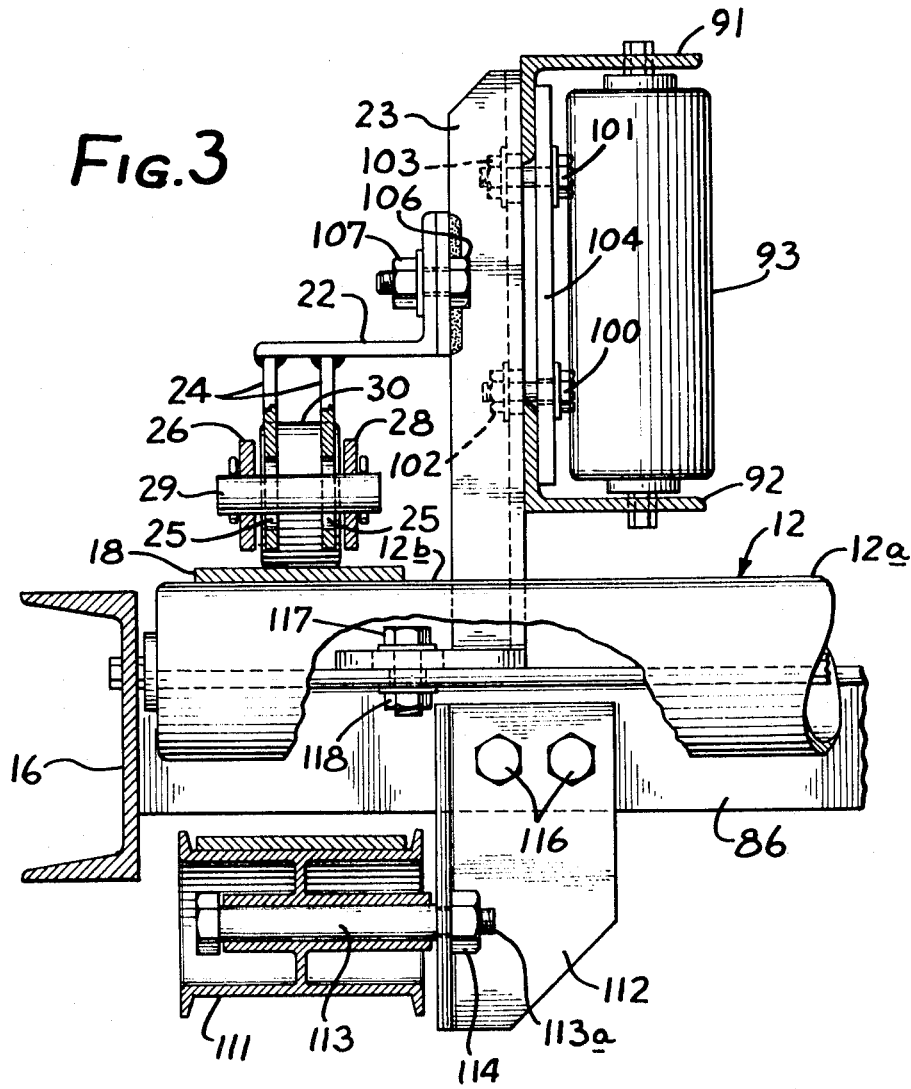

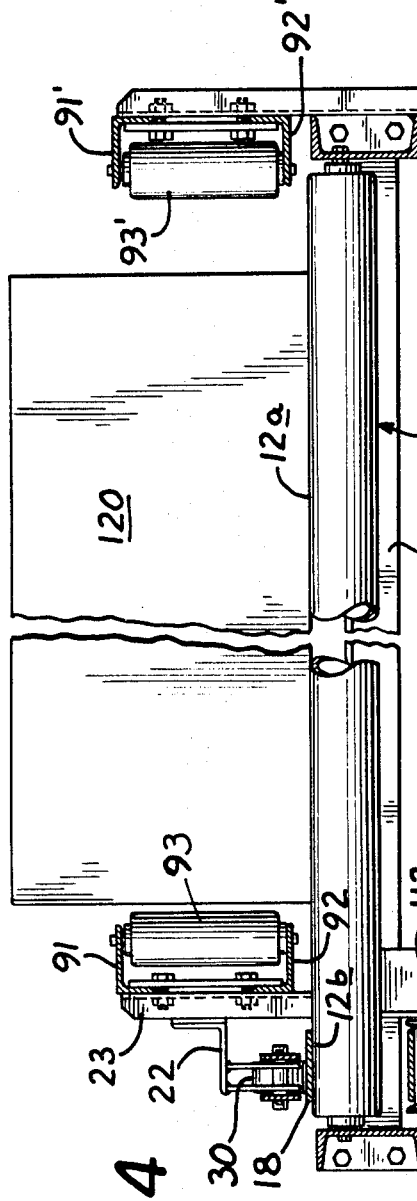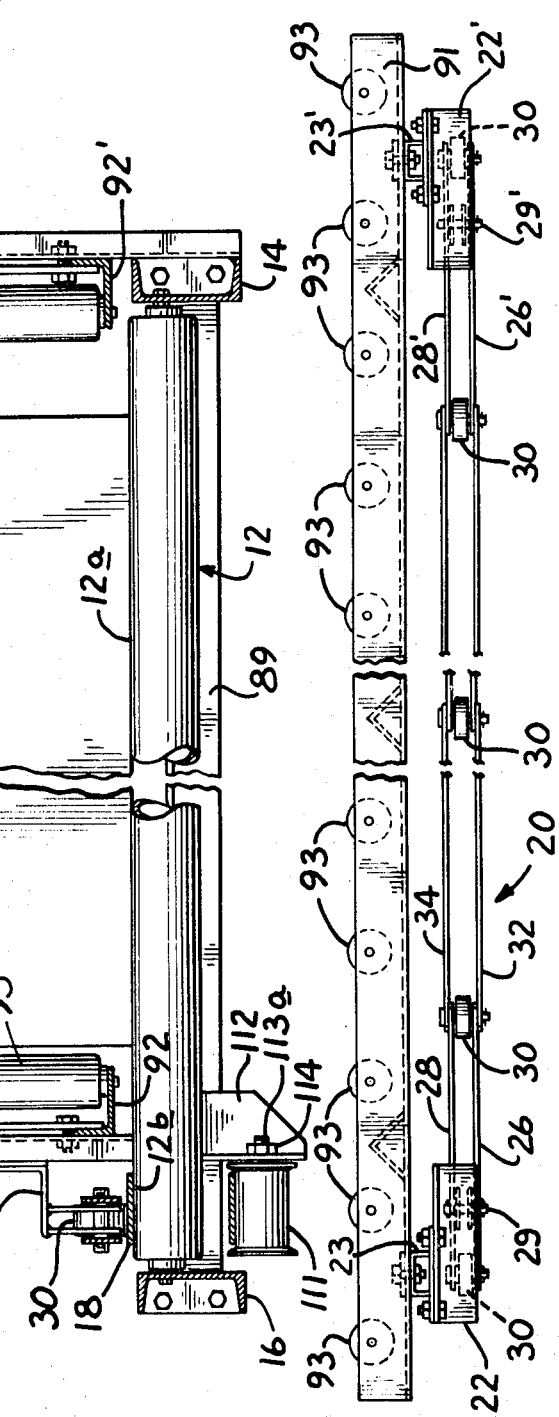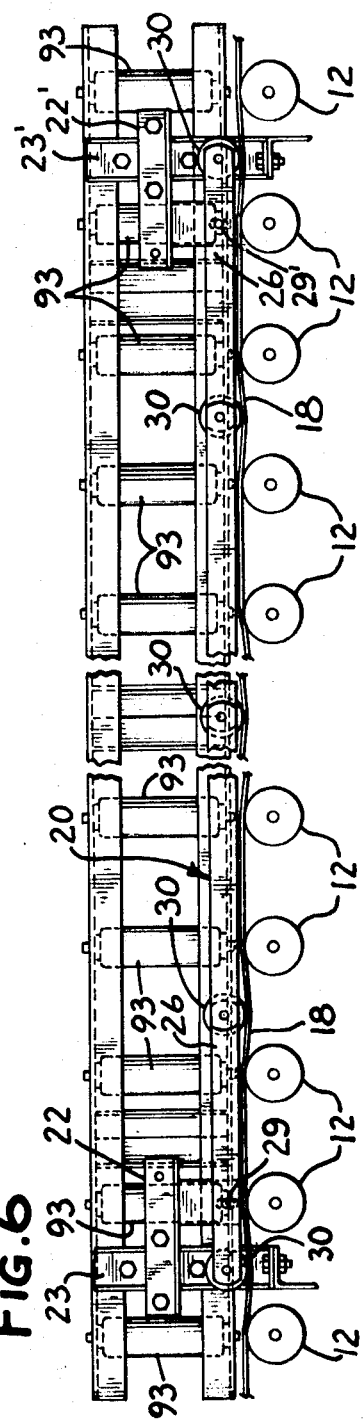

3,605,991
CONVEYING APPARATUS
Harold S. Burt, Wilmette, and Raymond E. Derflinger, Chicago, Ill., assignors to Conveyor Systems, Inc., Morton Grove, Ill.
Filed Aug. 11, 1969, Ser. No. 848,869
Int. Cl. B65g 13/07
U.S. Cl. 198—127R       1 Claim

ABSTRACT OF THE DISCLOSURE

A roller conveying apparatus having a plurality of conveying rollers for conveying articles supported thereon in a given direction, the conveying rollers being mounted for rotation about axes perpendicular to the direction in which the articles are conveyed, each of the conveying rollers having an article carrying portion and a belt receiving portion on the top thereof. There is provided an endless power transmission belt having an active run and a return run, the active run engages the belt receiving portion on the top of the conveying rollers for rotating the conveying rollers and driving the articles therealong, and belt pressure applying means above the active run of the power transmission belt and comprising a number of belt engaging means resting under force of gravity on the belt at points preferably between the conveying rollers and mounted for free floating movement above the belt, the drive power of the roller conveying apparatus being readily adjusted by merely changing the weight of said belt pressure applying means.

---

This invention relates generally to roller conveying apparatus and more particularly to a new and improved arrangement for transmitting and adjusting power to the roller thereof by a continuously moving endless belt.

Conveying apparatus of the type having a plurality of driven conveying rollers for transporting cartons or the like from one location to another are well-known in the art, there being many variations of design and configuration of this type of conveying apparatus. One means for driving the conveyer rollers is a continuously driven power transmission belt which an active run below the roller which is urged by belt engaging rollers upwardly against a portion of each of the conveying rollers to effect rotation thereof. When the conveying rollers carry heavy cartons and the movement of the cartons is stopped, as by the raising or lowering of a stop gate in the path of travel of the cartons while the rollers continue to rotate beneath the cartons, the cartons pile up one against the other and tension builds up in the power transmission belt which applies such an increased driving force against the rollers that the cartons can be crushed or the gate operating mechanism put under excessive load to render it inoperable.

An object of the invention is to provide a unique, simple and inexpensive arrangement of conveying rollers and a conveying roller power transmission belt arrangement where belt tension does not vary significantly with load on the conveying rollers.

A related object of the invention is to provide a conveying roller and a conveying roller power transmission belt arrangement as above described wherein the driving force of the conveying roller power transmission belt and the conveying rollers can be easily adjusted.

Briefly, in accordance with this invention, the active run of a power transmission belt passes above a drive portion of each conveying roller spaced from a carton receiving portion thereof and there is provided belt pressure applying means, preferably rollers located between the conveying rollers, which bear down principally under the force of gravity upon the transmission belt to force it against the conveying rollers. The belt pressure applying means are freely suspended over the power transmission belt so they can move freely transversely upwardly and downwardly of the transmission belt. In the most preferred form of this invention a plurality of belt pressure applying rollers are carried on respective links of a chain-like support where the links are pivotally secured at their ends to form a floating support for the belt pressure applying rollers. With this arrangement, the belt tension and roller driving force remains substantially constant with varying load. When additional driving force is required, the pressure of the belt against the conveying rollers can be readily adjusted by varying the weight of the assembly of the pressure applying rollers and links by adding weights thereto or varying the weight of the links.

The above and other objects, features and advantages of this invention will become apparent and fully understood from the following detailed description when taken in conjunction with the accompanying drawings wherein like reference numerals throughout the various views of the drawings are intended to designate similar elements or components.

FIG. 1 is a side elevational view of a conveying apparatus constructed in accordance with this invention with the center portion thereof broken away;

FIG. 2 is a top plan view of the conveying apparatus of FIG. 1;

FIG. 3 is a partial sectional view of the power transmission belt and belt pressure applying means used in the conveying apparatus of this invention;

FIG. 4 is a transverse sectional view of the conveying apparatus of FIGS. 1 and 2;

FIG. 5 is a top view of the belt pressure applying means and vertical guide rollers of the conveying apparatus of FIGS. 1 and 2; and FIG. 6 is a side elevational view of the belt pressure applying means and the vertical guide rollers of FIG. 5, but with the conveying rollers and power transmission belt shown in operative relation with the belt pressure applying means.

Referring now to FIGS. 1 and 2, there is seen a conveying apparatus constructed in accordance with this invention and designated generally by reference numeral 10. The conveying apparatus 10 comprises a plurality of parallel spaced apart conveying rollers 12 each having an article receiving portion 12a along which articles are transported from one location to another and a belt receiving portion 12b displaced from the article receiving portion 12a along one side of the conveying apparatus 10. The conveying rollers 12 are rotatably supported between a pair of longitudinal side rails 14 and 16 which may be fabricated in any suitable manner. An endless continuously moving power transmission belt 18 has the active run thereof passing over the conveying rollers 12 in the region of the belt receiving portion 12b for coupling power to the conveying rollers to transport articles therealong, the return run of the power transmission belt 18 passing beneath the conveying rollers 12 and engaging suitable idler and tension rollers to be described.

In accordance with this invention, belt engaging means 20, best seen in FIGS. 5 and 6, are provided for applying pressure to the top surface of the active run of the power transmission belt 18 to provide substantial pressure contact between the underside of the active run of the belt 18 and the peripheral surface of the conveying rollers. Most advantageously, the belt engaging means 20 is substantially free floating, it being able to move upwardly and downwardly in response to the tendency of the belt tension to increase and decrease. The belt engaging means 20 is supported from a pair of support brackets 22–22′ anchored to the ends of the conveyor frame. Additional support brackets may be used where a long conveyor is involved. Each support bracket 22 has depending therefrom guide means here comprising a pair of parallel horizontally laterally spaced apart support members 24—24 having vertically extending aligned slots 25—25 (FIG. 3) receiving a pin 29 vertically slidable in the slots. The pins 29–29' of the various support members carry short pairs of parallel laterally spaced apart horizontal link members 26 and 28 positioned on the opposite sides of each pair of support members 24—24. Alternatively, the support members 24—24 may have integrally associated therewith a pin which extends into a vertically elongated slot formed in the link members 26 and 28. Longitudinally spaced pressure applying rollers 30 are journalled between the various pairs of link members and form therewith an assembly which is free to move upwardly and downwardly. The rollers 30 rest under force of gravity upon the top surface of the power transmission belt 18 to press the belt in driving engagement with the belt receiving portions 12b of the conveying rollers 12.

Most advantageously, the pressure applying rollers 30 are located to be positioned between every other one of the conveying rollers 12 thus causing the power transmission belt 18 to slightly wrap about a small portion of every other one of the conveying rollers 12 to increase the friction receiving surface of the conveying roller 12 in contact with the continuously moving power transmission belt 18, as best seen in FIG. 6. However, it will be understood that the pressure applying rollers 30 may be located between each of the conveying rollers 12 and if desired, may be located directly over the conveying rollers.

The amount of power transmitted to the conveying rollers 12 by the power transmission belt 18 depends upon the weight or pressure applied to the power transmission belt 18 by the rollers 30, a decrease in weight providing a decrease in power applied to the conveying rollers 12 and an increase in weight providing a corresponding increase in the power transmitted to the conveying rollers 12. Thus, articles of different weight may be accommodated by merely adding weight to the vertically floating assembly of link members and rollers to increase the pressure applied to the power transmission belt 18. Thus, driving power and weight of the belt engaging means may be increased by either attaching weights (not shown) to the link members or by changing the link members to increase the weight thereof and, conversely, driving power and weight of the belt engaging means may be decreased by using lighter link members.

The ends of the conveying apparatus 10 may include several shortened rollers 40 (FIGS. 1 and 2) which are not power driven but which merely aid in guiding supporting articles along the ends of the conveying apparatus, the articles already having sufficient momentum to carry across the freely rotatable non-power driven rollers.

The illustrated power transmission belt 18 is extended around a driven flat pulley 42 which is fastened to a shaft 44 by a key 46. A V-groove pulley 48 is also keyed to the shaft 44 outwardly of the flat pulley 42 and receives a pulley belt 50 which, in turn, engages a pulley 52 driven by an electric motor 54 (FIG. 1) or other suitable power means. The power transmission belt 18 passes from the flat pulley 42 to a tension and idler pulley 56 which is rotatably mounted on an adjustable bracket 58 which has formed therein an elongated slot 58a for receiving a bolt 59 and associated nut means for locking the idler and tension pulley 56 in a suitable location. Similarly, another idler and tension pulley 60 shown located at the other end of the conveying apparatus 10 is rotatably mounted to an adjustable bracket 62 which has formed therein an elongated slot 62a for receiving a bolt 63. The idler and tension pulleys 56 and 60 are permanently locked in position by their associated bolts 59 and 63, respectively. However, a spring biased tension pulley 64 is urged in the direction of the arrowed line 64a by a tension spring 66 positioned about a shaft 68 having locking nuts 70 secured at one end thereof and engaging a suitable bracket formed on the side support rail 16. The tension pulley 64 is rotatably mounted on a support flange 72 fastened to the other end of the shaft 68 and the support flange 72 preferably engages guide rail means 74 for movement therealong. The tension pulley 64, by means of a biasing spring 66, continuously applies sufficient tension to the power transmission belt 18 to maintain the power transmission belt in slight contact with the upper surfaces of the conveying rollers 12. Finally, the power transmission belt 18 extends about an end roller 76 and then across the top surfaces of the conveying rollers 12. Although a particular arrangement of tension and idler pulleys is illustrated herein, it will be understood that these are illustrated by way of example and not by way of limitation, any desired configuration of such tension and idler pulleys being selected as desired depending on the configuration of the side support rails 14 and 16 of the conveying apparatus 10.

To maintain proper tension of the drive belt 50 between the V-shaped pulley 48 and the drive pulley 52, the motor 54 is mounted on an adjustable bracket 78 which slidably engages a rail support means 80 and is adjusted therealong by means of an adjusting screw 82. Also, suitable transverse support means 84 may be provided at the ends of the conveying apparatus 10 to maintain the side rails 14 and 16 at a predetermined spaced apart relation, it being understood that intermediate transverse support means 86 may also be used if desired.

To maintain substantial alignment of the power transmission belt 18 the return run of the power transmission belt passes over and in contact with a guide roller 111, FIG. 3, journalled to a depending bracket 112 by means of a shoulder bolt 113 having a nut 114 engaging the threaded end 113a thereof. The depending support bracket 112 is secured to the transverse support member 86 by a pair of bolts 116. Also secured to the transverse support member 86 is the vertically extending support bracket 23 which is fastened thereto by a bolt 117 and nut 118.

The conveying apparatus 10 includes a pair of vertically spaced apart rails 91, 92 and 91' and 92' for rotatably supporting therebetween a plurality of vertical guide rollers 93 and 93', respectively, the guide rollers 93 and 93' maintain articles 120 conveyed along the conveying apparatus 10 over the article receiving portion of the conveying rollers to prevent such articles 120 from interfering with the power transmission belt 18 or the belt engaging means 20 and to maintain such articles 120 upon the conveying apparatus.

Referring again to FIG. 3 there is seen an elevational partial sectional view of a transverse portion of the conveying apparatus of FIGS. 1 and 2 to more clearly illustrate the construction thereof. The vertically spaced apart support rails 91 and 92 are fastened to the vertical support bracket 23 by means of a pair of bolts 100 and 101 with their associated nuts 102 and 103, respectively, the bolts 100 and 101 passing through apertures formed in a support plate 104 which engages downwardly and upwardly turned portions of the support rails 91 and 92, respectively, to support and fasten these guide rails to the vertical support bracket 23. The horizontal support bracket 22 is fastened to the vertical support bracket 23 by a bolt 106 and nut 107, it being understood that several such nuts and bolts may be used.

Thus, the conveying apparatus of this invention provides means for easily transmitting power from a power transmission belt to the conveying rollers, and the power transmitting capabilities can be varied by increasing the weight applied by the belt engaging means 20. It will be understood that variations and modifications of this invention may be made without departing from the spirit and scope of the novel concepts disclosed and claimed herein.

What is claimed is:

1. Roller conveying apparatus comprising: a plurality of conveying rollers for conveying articles supported on said rollers in a given direction, said conveying rollers being mounted for rotation about axes perpendicular to said direction, each conveying roller having on the top thereof an article carrying portion and a belt receiving portion; an endless transmission belt having an active run and a return run, said active run engaging said belt receiving portion on the top of said conveying roller for rotating the conveying rollers so engaged when held thereagainst to drive the articles therealong; and belt pressure applying means above the active run of said belt, said belt pressure applying means including a number of belt engaging means mounted for free floating movement and engaging said belt under force of gravity at longitudinally spaced points along the active run of the belt, said belt engaging means comprising a plurality of rollers which roll over the active run of said belt, each roller being journalled between a pair of spaced apart side links, each pair of spaced apart side links being connected to the next pair of spaced apart side links by connecting means to form a chain-like structure positioned over the active run of said belt at points between said conveying rollers, guide means extending over the active run of said belt, one of said guide means and side links having vertical slots and the other of same having lateral extending projections fitting into and guided for vertical movement in the slots wherein the chain-like structure is freely guided for up and down movement, and means for constraining said chain-like structure against excess lateral movement relative to said belt.

References Cited

UNITED STATES PATENTS

| | | | |
|---|---|---|---|
| 3,040,872 | 6/1962 | Hohl | 198—127 |
| 3,275,124 | 9/1966 | Lutes et al. | 198—127 |

EVON C. BLUNK, Primary Examiner

A. N. GOODMAN, Assistant Examiner